Patented Sept. 25, 1923.

1,469,148

UNITED STATES PATENT OFFICE.

JOSEPH MARIE ALPHONSE CHEVALIER, OF VERSAILLES, AND PAUL BOURCET AND HENRI REGNAULT, OF PARIS, FRANCE.

CARBURANT FOR ALCOHOL.

No Drawing.   Application filed August 11, 1921.   Serial No. 491,526.

*To all whom it may concern:*

Be it known that we, JOSEPH MARIE ALPHONSE CHEVALIER, of 11 Rue de Mademoiselle, Versailles, Seine-et-Oise, PAUL BOURCET, of 8 Rue de l'Arrivee, Paris, and HENRI REGNAULT, of 38$^{bis}$ Avenue de la Republique, Paris, France, have invented a Carburant for Alcohol, of which the following is a full, clear, and exact description.

The present invention relates to a process of carburation of alcohol, the object of which process is to furnish the alcohol with volatile products rich in carbon and capable of imparting to it a calorific power comparable to that of petroleum benzine.

This process also offers the advantage of utilizing substances which can be obtained at an economical cost price and in quantity sufficient to avoid the necessity of being compelled to have recourse to importation.

The process of carburation which forms the subject matter of this invention, is characterized by the addition to the alcohol of the volatile spirit of resin called camphine and known also in commerce under the name of volatile oil of resin. It is the most volatile portion of the distillate of resin, boiling between 80° C. and 250° C.

Volatile oil of resin (camphine) constitutes a good carburant for alcohol by reason of the volatile products rich in carbon which it contains and by its property of dissolving easily in alcohol.

The present invention is also characterized by the addition of light acetone oil to the resin spirit, the light acetone oil referred to being an acetone oil the boiling point of which lies between 70 and 130 degrees C.

This light acetone oil (which as is known, is obtained from the residues resulting from the rectification of crude acetone and which are higher fatty ketones in which ethylmethylketone predominates) has the property of acting as a "combine", that is to say of permitting homogeneous and stable solutions of resin spirit in commercial alcohol to be obtained.

This addition of light acetone oil is not necessary in the case of absolute alcohol.

By way of example, the proportions of this carburant in relation to the alcohol to be carburetted will be the following:

|   | Grams. |
|---|---|
| Alcohol | 1000 |
| Volatile oil of resin of a mean density of 0.890 | 200 to 500 |
| Oil of acetone | 125 |

It must be quite understood that these proportions are given by way of example only, and that they can be modified.

It is likewise possible, in certain cases, to employ, in order to carburate the alcohol, another volatile liquid product derived from the distillation of pine resin, spruce, etc. Thus for example alcohol can be carburetted by the addition of essence of terebenthine, when the cost price of this product is sufficiently low to permit of its industrial utilization. In order however to augment the solubility of the essence of terebenthine, it must have another terpene added to it.

In consequence of the special nature of the substances entering into the composition of the carburant forming the subject matter of this invention, the present process permits of the solution of the problem of the carburation of alcohol in a simple and economical manner.

Claims:

1. A process for carburetting alcohol characterized by the addition to this latter of the volatile spirit of resin known in commerce under the name of volatile oil of resin.

2. A process for carburetting alcohol characterized by the addition to this latter of volatile oil of resin to which is added light acetone oil.

3. A carburant for alcohol composed of volatile oil of resin of a mean density of 0.890 and light acetone oil.

The foregoing specification of our carburant for alcohol signed by us this 2nd day of August 1921.

JOSEPH MARIE ALPHONSE CHEVALIER.
PAUL BOURCET.
HENRI REGNAULT.